US005724214A

United States Patent [19]

Ahn

[11] Patent Number: 5,724,214

[45] Date of Patent: Mar. 3, 1998

[54] DISCHARGING DEVICE FOR HEAD DRUM

[75] Inventor: Seong-Ick Ahn, Seoul, Rep. of Korea

[73] Assignee: Daewoo Electronics Co., Ltd., Seoul, Rep. of Korea

[21] Appl. No.: 753,889

[22] Filed: Dec. 2, 1996

[30] Foreign Application Priority Data

Nov. 30, 1995 [KR] Rep. of Korea ........................ 95-45165

[51] Int. Cl.[6] ........................ G11B 5/53

[52] U.S. Cl. ........................ 360/107; 360/130.23

[58] Field of Search ........................ 360/107, 108, 360/130.24, 130.33, 130.22, 84; 361/212, 220

[56] References Cited

U.S. PATENT DOCUMENTS

| | | | |
|---|---|---|---|
| 4,623,944 | 11/1986 | Yamashita | 360/84 |
| 4,654,738 | 3/1987 | Kato et al. | 360/130.24 |
| 5,119,257 | 6/1992 | Itou et al. | 360/130.24 |
| 5,442,506 | 8/1995 | Kang | 360/84 |
| 5,486,966 | 1/1996 | Ahn | 360/84 |
| 5,568,334 | 10/1996 | Lee | 360/107 |

FOREIGN PATENT DOCUMENTS

| | | | |
|---|---|---|---|
| 61-196456 | 8/1986 | Japan | 360/130.24 |
| 1130316 | 5/1989 | Japan | 360/130.24 |
| 2-62708 | 3/1990 | Japan | 360/130.24 |
| 2110811 | 4/1990 | Japan | 360/130.24 |
| 5166249 | 7/1993 | Japan | 360/130.24 |
| 2149955 | 6/1985 | United Kingdom | 360/130.22 |

*Primary Examiner*—Stuart S. Levy
*Assistant Examiner*—David L. Ometz
*Attorney, Agent, or Firm*—Beveridge, DeGrandi, Weilacher & Young LLP

[57] ABSTRACT

The present invention is related to a discharging device for a head drum, and more particularly to a discharging device, wherein the static electricity which occurred from the head drum is effectively discharged using the discharge device. A fixed end of a bracket is fixed on a main chassis by a screw, and a free end forms a bracket protrusion. A coil spring is put on the free end of the bracket. A first end of a leaf spring is put inside the coil spring together with the free end of the bracket, and the first end forms a leaf spring protrusion. A tip is installed between a second end of the leaf spring and the head drum. Static electricity transmitted to the tip is transmitted to the bracket via the leaf spring. Then, static electricity is discharged through the main chassis. Thus, this discharging device can improve productivity since extra riveting or bonding is unnecessary. Also, the grounding property of the head drum is improved because the close adhesion between the tip and the revolving shaft is ensured by the coil spring.

6 Claims, 3 Drawing Sheets

DISCHARGING DEVICE FOR HEAD DRUM

BACKGROUND OF THE INVENTION

1. Field of the Invention

The present invention relates to a discharging device for a head drum which is used for a VCR(Video Cassette Recorder), and more particularly to a discharging device for a head drum which discharges static electricity generated from the head drum to the main chassis.

2. Description of the Prior Art

Generally, a head plays the signal which was recorded on the magnetic tape or records the signal on the magnetic tape while the magnetic tape sticks to the peripheral surface of the head drum. However, static electricity is generated between the head drum surface and the magnetic tape since the magnetic tape travels in the condition in which it contacts a peripheral surface of the head drum. This static electricity disturbs the smooth running of the magnetic tape and has a negative effect during replay or recording of the signal.

The partial plan view of a VCR in which such a conventional discharging device for a head drum is installed is shown in FIG. 1. As shown in FIG. 1, on the main chassis 12 of the VCR, the discharging device 10 is installed around the head drum 26. The head drum 26 may possibly turn with revolving shaft 24. A tip 22 contacts the upper portion of revolving shaft 24. The tip 22 is installed at the end of leaf spring 19, and the one end of the bracket 16 is fixed on the main chassis 12 by a screw 14.

The perspective view of the discharging device for VCR shown in FIG. 1 is shown in FIG. 2. As shown in FIG. 2, the tip 22 contacts the revolving shaft 24 of the head drum 26. The tip 22 is fixed on the end of leaf spring 19, and the other end of leaf spring 19 is fixed on bracket 16 by a rivet 18. Rubber 20 which has elasticity is stuck to one side of leaf spring 19. The other end of bracket 16 is fixed on main chassis 12 by screw 14. Such a tip 22, leaf spring 19 and bracket 16 are made of metallic material which allows good electrical conductivity.

The VCR having the above-described conventional discharging device for the head drum is operated as below.

When the head drum 26 turns, static electricity is generated between the magnetic tape and head drum 26. This static electricity is transmitted to bracket 16 via tip 22 and leaf spring 19. After that static electricity is transmitted to main chassis 12 and then is discharged.

Since the above-conventional discharging device for the head drum is manufactured by various processes, a main disadvantage is that the cost is high. Also, because the tip 22 sticks to revolving shaft 24 with the elastic force of the rubber 20 and leaf spring 19, when leaf spring 19 is transformed the state of contact deformed. This deterioration is problematic because the discharging effect of the head drum is reduced.

SUMMARY OF THE INVENTION

Therefore, the present invention is devised to solve the foregoing problems. It is an object of the present invention to provide a discharging device for a head drum, wherein the static electricity which occurs from the head drum can be effectively discharged by using a discharge device which has a simple structure.

To achieve the above object of the present invention, a discharging device for a head drum includes a bracket in which a fixed end is fixed on a main chassis. Also, a coil spring is put on a free end of the bracket. A first end of the leaf spring is put inside the coil spring together with the free end of the bracket, and the second end of the leaf spring contacts a head drum.

Here, it is preferable that the bracket has a bracket protrusion at the free end of the bracket to contain the coil spring. The leaf spring has a leaf spring protrusion at the first end of the leaf spring to contain the coil spring.

Preferably, the leaf spring further comprises a tip at the second end of the leaf spring to reduce the frictional force between the second end of the leaf spring and the head drum. The tip is to contact a revolving shaft end face of the head drum. Furthermore, the tip is to contact a center of the upper end face of the revolving shaft.

Preferably, one end of the bracket is fixed on the main chassis by a screw.

Alternatively, the object of the present invention is achieved by a discharging device for head drum including a bracket in which a fixed end is fixed on a main chassis by the screw and a free end forms a bracket protrusion. A coil spring is put on the free end of the bracket. A first end of leaf spring is put inside the coil spring together with the free end of the bracket and forms a leaf spring protrusion to contain the coil spring. A tip is installed between the second end of the leaf spring and the head drum and in contact with a center of an upper end face of a revolving shaft.

The discharging device for head drum constructed as above is operated as described below.

When the head drum turns, static electricity is generated between the magnetic tape and head drum. This static electricity is transmitted to bracket 16 via tip and leaf spring. After that, static electricity is transmitted to the main chassis and is then discharged.

Therefore, according to the discharging device for the head drum described as above, productivity is improved because the discharging device can be quickly assembled without other riveting work. Also, because the tip is securely attached, there is an advantage that the discharging effect increases.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Hereinafter, a discharging device for a head drum according to the present invention will be described in detail with reference to an embodiment illustrated in the accompanying drawings.

Figure 1:
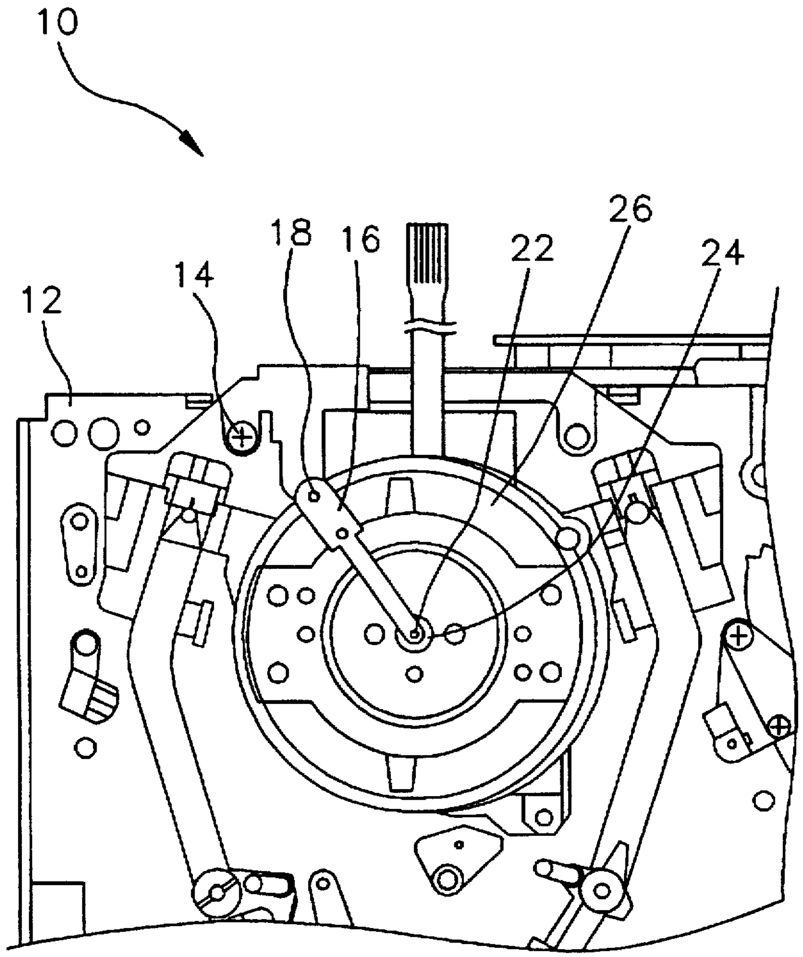
FIG. 1 PRIOR ART
FIG. 1 is a partial plan view of a VCR in which a conventional discharging device for a head drum is installed.
Figure 2:
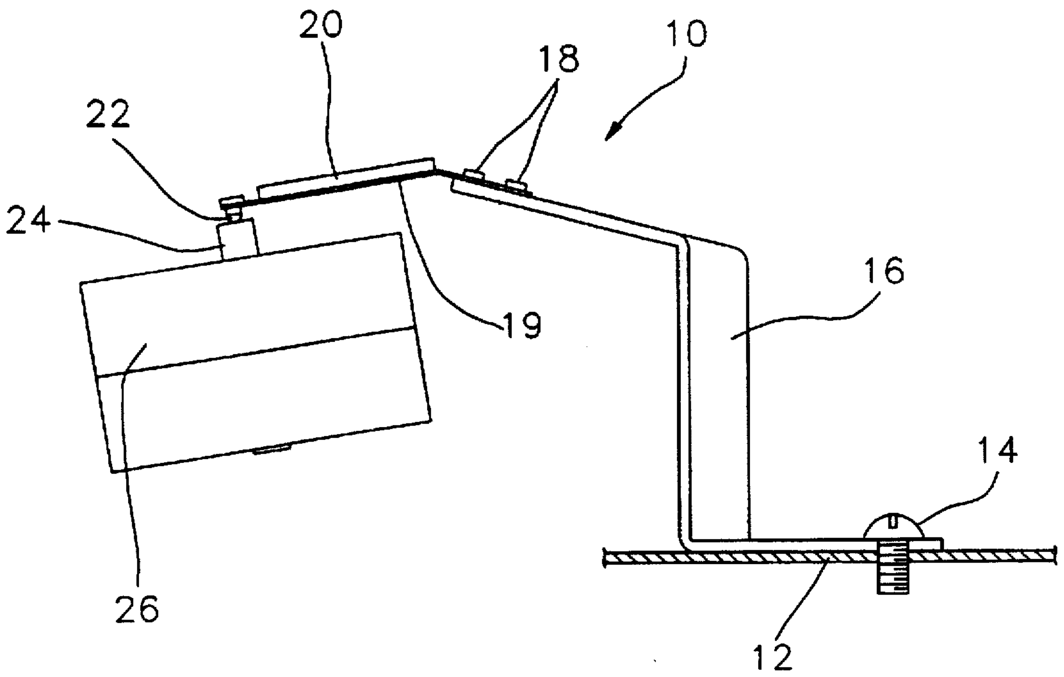
FIG. 2 PRIOR ART
FIG. 2 is a perspective view of the discharging device for the VCR shown in FIG. 1.
Figure 3:
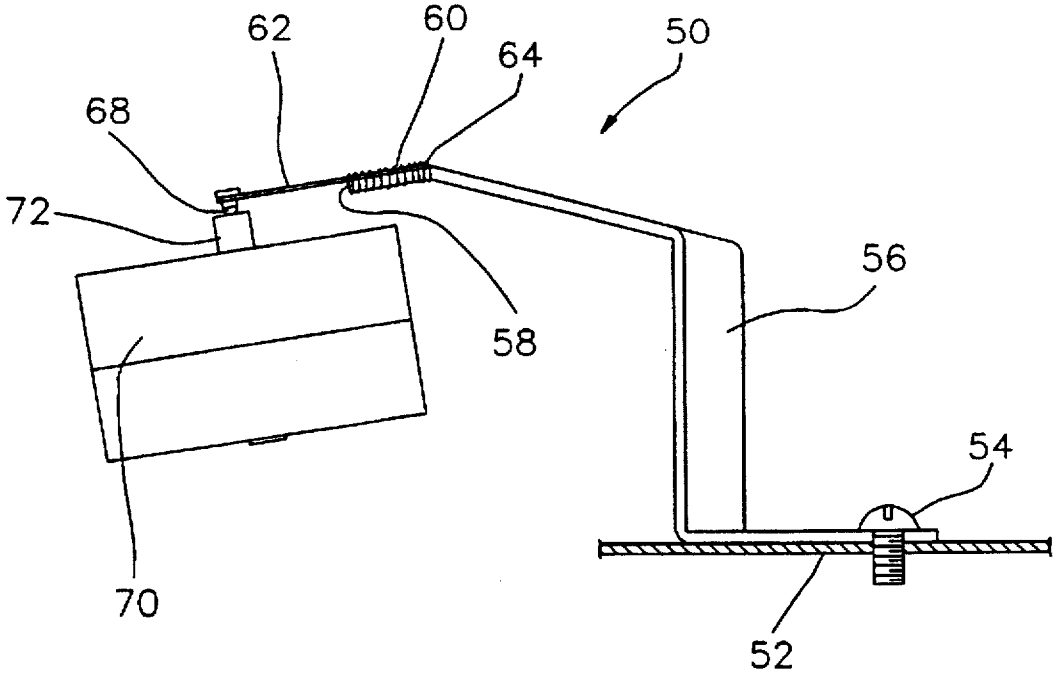
FIG. 3 is a perspective view of the discharging device for the head drum according to the present invention.

FIG. 3 is a perspective view of the discharging device for the head drum according to the present invention. As shown in FIG. 3, the discharging device 50 for the head drum consists of a bracket 56, leaf spring 62, coil spring 60, and tip 68.

As for the bracket 56, a fixed end is bent and the free end forms a bracket protrusion 58. This bent portion is fixed on the main chassis 12 by a screw 14.

A leaf spring protrusion 64 is formed at a first end of leaf spring 62. Tip 68 is fixed at a second end of leaf spring 62. Such a leaf spring 62 is produced using sheet copper. The tip 68 contacts with the revolving shaft 72 of the head drum 70. That is, tip 68 maintains attached to the upper end face of the revolving shaft 72 by the initial elastic force of the leaf spring 62 and coil spring 60.

Coil spring 60 is installed at a portion in which a first end of leaf spring 62 and the free end of bracket 56 are in contact. The coil spring 60 is assembled by bracket protrusion 58 and leaf spring protrusion 64.

Figure 4:
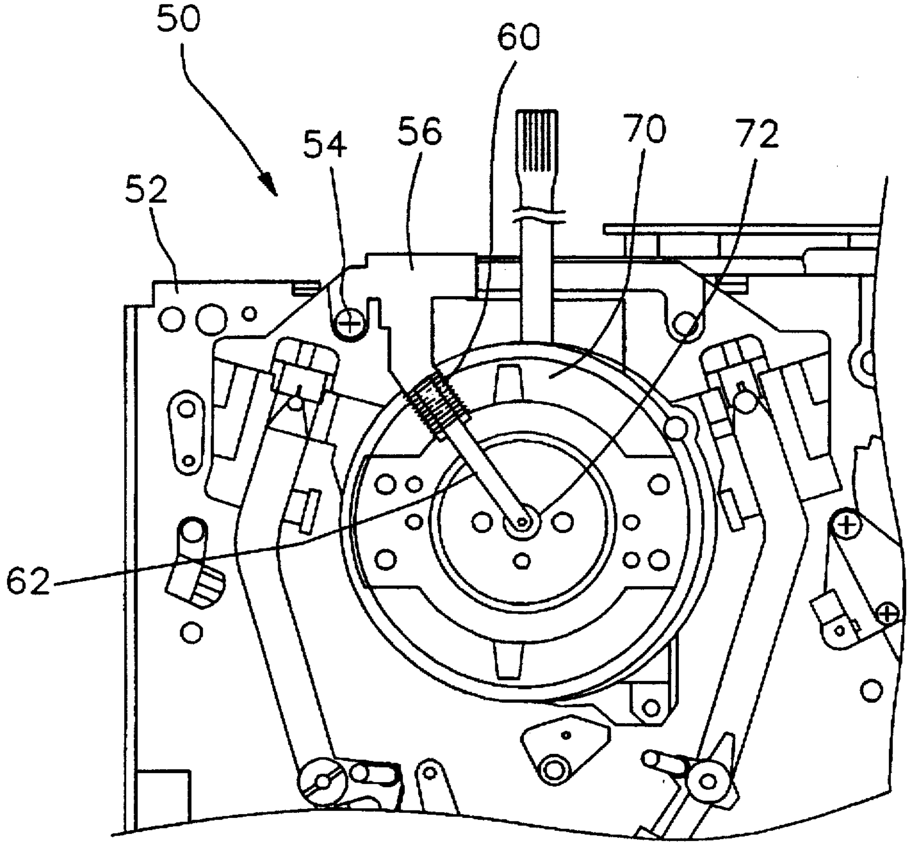
FIG. 4 is a partial plan view of the VCR in which the discharging device for the head drum as shown in FIG. 3 is installed.

FIG. 4 is a partial plan view of the VCR in which a discharging device for the head drum as shown in FIG. 3 is installed. As shown in FIG. 4, the discharging device 50 is installed near the head drum 70 which has been arranged on the main chassis 52. The leaf spring 62 is extended to revolving shaft 72 of the head drum 70. The coil spring 60 is installed at the portion where the leaf spring 62 and bracket 56 come together. The fixed end of bracket 56 is fixed to the main chassis 52 by screw 54.

The operation and effect of the discharging device for the head drum according to the present invention constructed as above will be described hereinbelow.

When the head drum 70 turns, static electricity is generated between the magnetic tape and head drum 70. This static electricity is transmitted to bracket 56 via tip 68 and leaf spring 62. After that, static electricity is transmitted to main chassis 52 and discharged.

Coil spring 60 is able to transmit the static electricity since the first end of leaf spring 62 and the free end of bracket 56 are attached together by the spring force. The coil spring 60 assembly is achieved by a process in which the coil spring 60 is installed between bracket protrusion 58 and leaf spring protrusion 64.

As a result, according to the discharging device for the head drum, the assembly process is achieved without extra riveting or bonding process That is, the productivity can be improved since the assembly process can be done quickly by hand. Also, the grounding property of the head drum is improved because close adhesion between the tip and the revolving shaft is ensured by the coil spring.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A discharging device for a head drum comprising:
   - a bracket in which a fixed end is fixed on a main chassis and a free end has a bracket protrusion;
   - a coil spring which coils that surround the bracket protrusion of the bracket;
   - a leaf spring in which a first end is put inside the coil spring together with the bracket protrusion of the bracket, and a second end contacts the head drum; and
   - said leaf spring has a leaf spring protrusion at the first end of the leaf spring that is contained by the coils of the coil spring.
2. The discharging device for the head drum as claimed in claim 1, wherein said leaf spring further comprises a, tip at the second end of the leaf spring to reduce a frictional force between the second end of the leaf spring and the head drum.
3. The discharging device for the head drum as claimed in claim 2, wherein said tip makes contact with a revolving shaft end face of the head drum.
4. The discharging device for the head drum as claimed in claim 3, wherein said tip is to contact a center of the end face of the revolving shaft.
5. The discharging device for the head drum as claimed in claim 1, wherein said fixed end of the bracket is fixed on the main chassis by a screw.
6. A discharging device for a head drum comprising:
   - a bracket in which a fixed end is fixed on a main chassis by a screw and a free end forms a bracket protrusion;
   - a coil spring with coils that surround the bracket protrusion of the bracket;
   - a leaf spring in which a first end is put inside the coil spring together with the bracket protrusion of the bracket and forms a leaf spring protrusion that is contained by the coils of the coil spring; and
   - a tip installed between a second end of the leaf spring and the head drum and in contact with a center of an upper end face of a revolving shaft.

* * * * *